United States Patent [19]

Boyce et al.

[11] Patent Number: 5,667,859
[45] Date of Patent: Sep. 16, 1997

[54] REINFORCED JOINT FOR COMPOSITE STRUCTURES AND METHOD OF JOINING COMPOSITE PARTS

[75] Inventors: Joseph Santin Boyce, Hanover; Glenn Alexander Freitas, Foxboro; Constance Lee Magee, Littleton, all of Mass.

[73] Assignee: Foster-Miller, Inc., Waltham, Mass.

[21] Appl. No.: 383,087

[22] Filed: Feb. 3, 1995

Related U.S. Application Data

[62] Division of Ser. No. 56,029, Apr. 30, 1993.

[51] Int. Cl.⁶ .................. D04H 1/16; B32B 5/22; D02G 3/00
[52] U.S. Cl. .................. 428/59; 428/398; 428/404; 428/408; 428/300.7
[58] Field of Search .................. 428/248.1, 105, 428/282, 357, 364, 224, 398, 404, 408, 297, 298, 299, 301; 156/89, 92, 93, 304.3, 304.5, 304.6; 264/29.1; 228/120, 121, 151, 193, 194, 208, 263.19, 263.21

[56] References Cited

U.S. PATENT DOCUMENTS

| | | |
|---|---|---|
| 3,822,173 | 7/1974 | Graber et al. ............... 428/301 |
| 3,908,057 | 9/1975 | Smith, II .................... 428/301 |
| 3,937,861 | 2/1976 | ZUckerman et al. ........... 428/301 |
| 3,956,560 | 5/1976 | Smith, II .................... 428/301 |
| 4,529,644 | 7/1985 | Awano et al. ................ 428/301 |
| 4,808,461 | 2/1989 | Boyce et al. ................. 428/119 |
| 4,923,540 | 5/1990 | Born et al. .................. 156/86 |
| 5,021,107 | 6/1991 | Holko ........................ 156/89 |
| 5,236,771 | 8/1993 | Groshens ..................... 428/301 |
| 5,330,604 | 7/1994 | Allum et al. ................. 156/304.7 |

FOREIGN PATENT DOCUMENTS

| | | |
|---|---|---|
| 3147228A1 | 6/1983 | Germany . |
| 3246803A1 | 6/1984 | Germany . |
| 55-121027 | 3/1979 | Japan . |
| 0783035 | 11/1980 | U.S.S.R. . |
| 2040805A | 1/1980 | United Kingdom . |

*Primary Examiner*—Paul R. Michl
*Assistant Examiner*—Kathryne E. Shelborne
*Attorney, Agent, or Firm*—Iandiorio & Teska

[57] ABSTRACT

A method of joining composite parts including disposing reinforcing elements through the thickness of two composite adherends to be joined, at least a number of the reinforcing elements extending from the joint surface of each adherend; assembling the adherends so the joint surface of one faces the joint surface of the other defining a joint region therebetween, wherein the extending reinforcing elements are interstitially disposed in the joint region; and disposing an adherent within the joint region about the interstitially disposed reinforcing elements and the joint surface for providing an improved and reinforced joint.

8 Claims, 4 Drawing Sheets

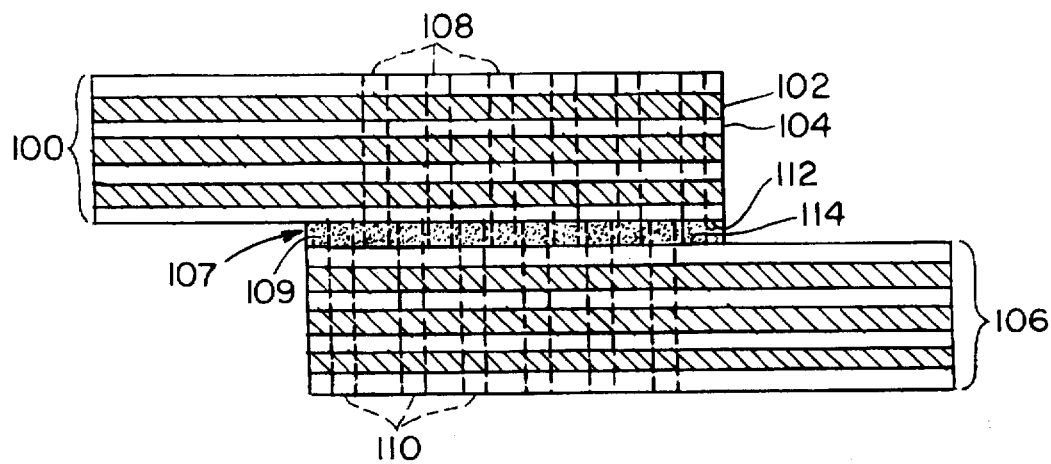
FIG. 9
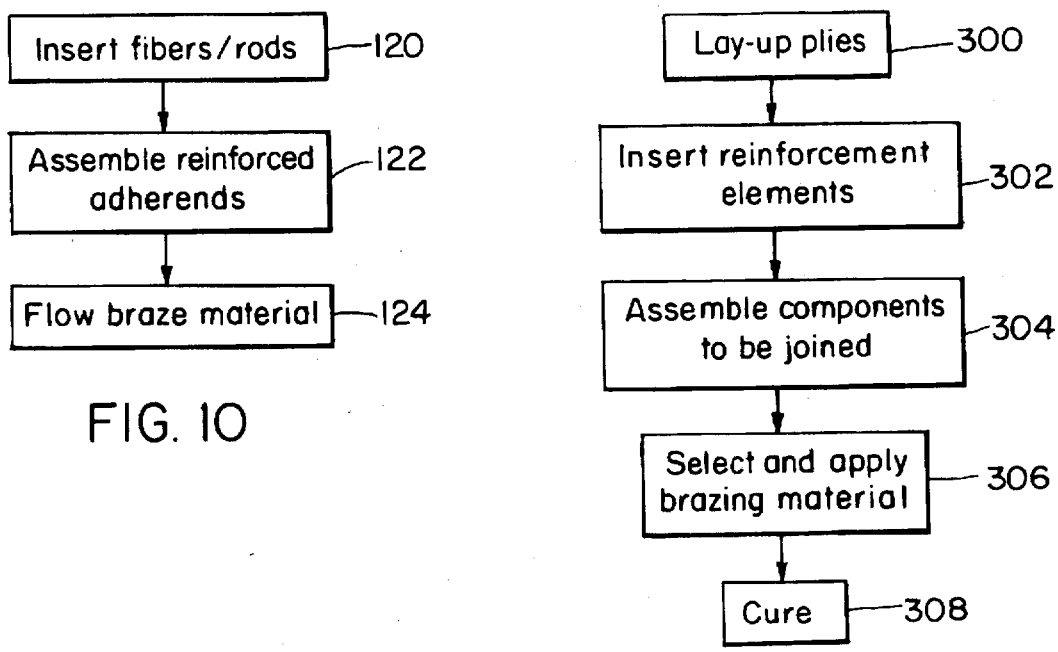
FIG. 10
FIG. 14

STEP 1

STEP 2

STEP 3

REINFORCED JOINT FOR COMPOSITE STRUCTURES AND METHOD OF JOINING COMPOSITE PARTS

This is a division, of application Ser. No. 08/056,029, filed on Apr. 30, 1993.

FIELD OF INVENTION

This invention relates to a reinforced joint for connected composite structures and a method of joining composite parts.

BACKGROUND OF THE INVENTION

Composite laminate structures have been widely used and generally comprise layers of plies each including an array of fibers in a resin matrix.

Prior art methods of joining two or more composite structures or components includes the use of epoxies for low temperature joints and silver base braze alloys for intermediate temperature joints. Holko (U.S. Pat. No. 5,021,107) found, however, that for high temperature applications, wherein carbon-carbon composite component joints must withstand temperatures as high as 3000° F., an interlayer material used in the joint between the components, such as $TiSi_2$, vacuum furnace brazed, resulted in an improved joint.

But still, failures occur at the joint or even between the first few plies of the composite material.

SUMMARY OF THE INVENTION

It is therefore an object of this invention to provide an improved joint between two composite structures or components resulting in a stronger bond between two structures.

It is a further object of this invention to provide such an improved joint between two composite structures which reduces delamination of the plies at the joint region between the structures.

It is a further object of this invention to provide a method of joining composite parts which increases the surface area at the joint region for a stronger joint.

It is a further object of this invention to provide a reinforced composite structure joint which increases the overall strength of each composite structure in addition to providing a more cohesive bond at the joint region between the composite structures.

This invention results from the realization that the transverse strength of a composite structure can be increased by translaminar reinforcement of the composite structure including fibers disposed through the thickness of the structure, and further that the strength of a joint between two such reinforced composite structures can be achieved by leaving the translaminar reinforcing fibers exposed at the surface of the structure at the joint region and then flowing a braze or other adherent material into the joint region and about the exposed fibers, and the further realization that in some cases the adherent material can be urged partially along the length of the reinforcing fibers and into each structure thereby providing a more cohesive bond at the joint region.

This invention features a method of joining composite parts including the steps of disposing a plurality of reinforcing elements through the thickness of two composite adherends to be joined wherein at least a number of the reinforcing elements are left extending from the joint surface or just left exposed at the joint surface of each adherend. Next, the adherends are assembled so that the joint surface of one adherend faces the joint surface of the other adherend defining a joint region therebetween and wherein the extending reinforcing elements are interstitially disposed in the joint region. Finally, an adherend is disposed within the joint region about the interstitially disposed reinforcing elements and the joint surfaces for a reinforced joint between the composite parts. The adherends may be carbon-carbon composite structures and the reinforcing elements may be boron fibers. In such an embodiment, the adherent is a metallic braze material.

This invention also features a joined composite part structure comprising a pair of composite adherends each including a plurality of reinforcing elements disposed through the thickness thereof wherein at least a number of the reinforcing elements are left extending from the joint surface of each adherend. Further included is a joint region between the adherends bounded by the joint surface of each adherend and including the extending reinforcing elements interstitially disposed therein. An adherent, about the extending interstitially disposed reinforcing elements, and between the joint surfaces within the joint region completes the joint between the two composite parts.

This invention also features a method of joining composite parts comprising disposing a plurality of reinforcing elements through the thickness of two composite adherends, wherein the reinforcing elements are left extending from the joint surface of each adherend; assembling the adherends so that the joint surface of one adherend faces the joint surface of the other adherend; disposing an adherent interlayer between the opposing joint surfaces; and urging the extending reinforcing elements of each adherend through the adherent interlayer and interstitially locking the reinforcing elements therein. If the adherent interlayer is a prepreg material, the method further includes a step of curing the prepreg material to lock the reinforcing elements therein.

Also featured is a joined composite structure including a pair of composite adherends wherein only one adherend includes a plurality of reinforcing elements disposed through the thickness thereof and extending from the joint surface. A joint region between the adherends includes the joint surface of each adherend and the extending reinforcing elements of the one adherend disposed against the joint surface of the other adherend wherein an adherent is disposed in the joint region about the extending reinforcing elements and between the joint surfaces.

A method of making such a joined composite part includes disposing a plurality of reinforcing elements through the thickness of a first composite adherend to be joined wherein at least a number of the reinforcing elements are left extending from the joint surface thereof; assembling the first adherend with the second adherend such that the joint surface of the first adherend faces the joint surface of the second adherend at the joint region therebetween and the extending elements of the first adherend are disposed against the joint surface of the second adherend; and finally disposing an adherent within the joint region.

Alternatively, after assembling the first adherend with the second adherend such that the joint surface of the first adherend faces the joint surface of the second adherend, an interlayer adherent may be disposed between the opposing joint surfaces and the extending reinforcing elements of the first adherend may be urged through the adherent interlayer and against the joint surface of the second adherent for locking the reinforcing elements in the adherent interlayer. If the adherent material is a prepreg material, the method further includes a step of curing the prepreg material.

This invention also features a method of joining composite parts even if the reinforcing elements are not left extending from one or both of the adherends: the reinforcing elements are disposed through the thickness of the two composite adherends at the joint surface of each adherend to be joined; the adherends are assembled so that the joint surface of one adherend faces the joint surface of the opposing adherend; and an adherent is disposed within the joint region and urged to flow at least partially along the length of the reinforcing elements within the adherends for a reinforced joint.

This invention also features a method of joining a composite part with a non-composite part comprising inserting through the thickness of the composite part, a plurality of reinforcing elements at least at the joint region thereof; assembling the composite part such that the reinforcing elements are disposed proximate the joint surface of the non-composite part; and brazing the joint surfaces and the reinforcing elements to form a joint.

This invention also features a method of joining composite parts wherein the braze material is selected to be compatible with the composite parts and the reinforcing elements. If the adherent interlayer methodology is used, a prepreg material may be selected and cured by subjecting the joined assembly to elevated pressure and temperature cycles.

This invention features a method of joining composite parts with non-composite pans including inserting, through the thickness of the composite parts, a plurality of reinforcing elements at least at the joint region thereof; assembling the composite parts such that the reinforcing elements are disposed proximate the joint surface of the non-composite part; and brazing the joint surfaces and urging braze material to flow along the lengths of the reinforcing elements into the composite part.

Finally, this invention features a joined structure including two adherends. The first adherend has reinforcing elements left exposed at the joint surface (extended, flush, or recessed), and the joint surface of the second adherend is disposed proximate the exposed reinforcing elements of the first adherend. An adherent about the exposed reinforcing elements and the joints surfaces secures the two structures and results in an improved bond between the two parts.

DISCLOSURE OF PREFERRED EMBODIMENT

Other objects, features, and advantages will occur to those skilled in the art from the following description of a preferred embodiment and the accompanying drawings in which:

FIG. 9 is a schematic diagram of a reinforced joint according to this invention for joining carbon-carbon composite structures;

FIG. 10 is a processing flow diagram showing the processing steps for the method of joining composite parts according to this invention;

FIG. 14 is a more detailed process flow diagram for the method of joining composite parts according to this invention.

Figure 1:
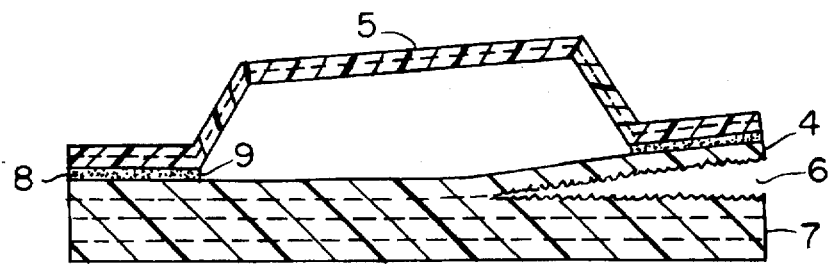
FIG. 1 is a schematic diagram of a prior art joint between two composite parts.

Joining one composite part such as stiffener 5, FIG. 1, to composite structure 7 in the prior art utilizes adhesive or brazing material 8 between the parts at the joining surfaces. As delineated in the background of invention, however, such a joint 9 is subject to delamination. If the joint is stronger than the laminated layers of composite part 7, delamination of the top plies 4 as shown at 6 may occur.

Figure 2:
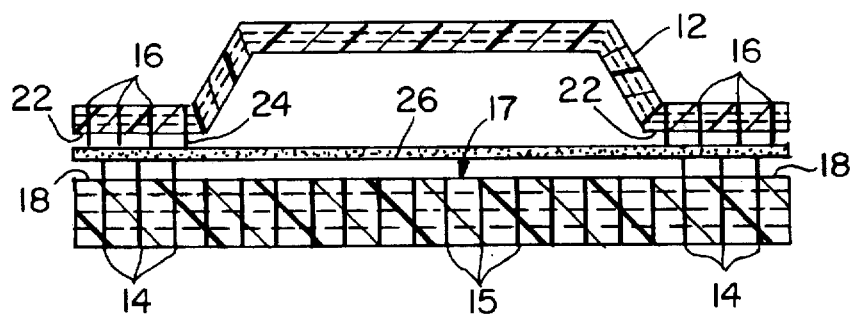
FIG. 2 is a schematic diagram of the assembly used for joining two composite parts according to this invention just prior to forming a reinforced joint.

Joining composite adherend 10, FIG. 2, with composite adherend stiffener structure 12, according to this invention, however, includes the use of through-the-thickness reinforcing elements 14 for adherend 10 and through the thickness reinforcing elements 16 for adherend 12. As used herein, "adherend" denotes one part or structure to be joined with another part or structure. Along the joint surface 18 of adherend 10, the reinforcing elements 14 are exposed or even left extending as shown at 20. Similarly, along the joint surface 22 of adherend 12, the reinforcing elements 16 are exposed as shown at 24. Outside of joint region, the reinforcing elements 15 may be filed flush as shown at 17.

An adherent interlayer 26 such as film adhesive or prepreg material is then disposed between adherend 10 and adherend 12, and in one embodiment, pressure is used to drive extending reinforcing elements 16 and extending reinforcing elements 14 into adherent 26 which is then cured.

Figure 3:
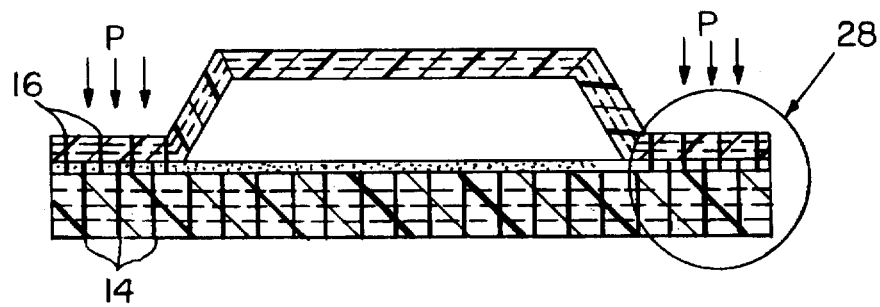
FIG. 3 is a schematic diagram of a reinforced joint for composite structures according to this invention.
Figure 4:
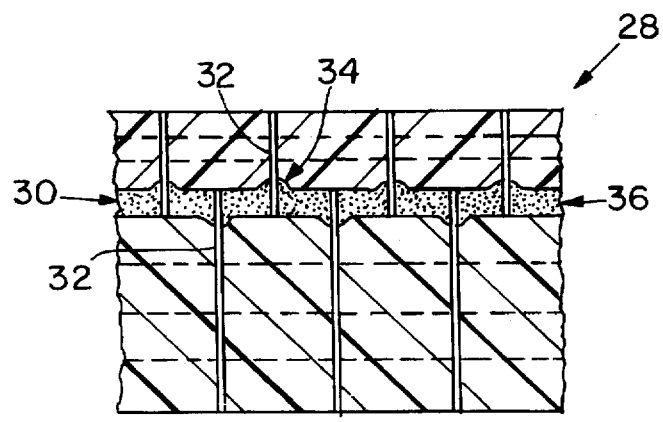
FIG. 4 is a more detailed view of one portion of a reinforced joint for composite structures according to this invention.

Therefore, one key improvement, as shown at 28, FIG. 3, further shown at joint region 30, FIG. 4, is that there is more surface area in the joint region 30 for adherent 26 to secure the joint surfaces of each part: that is, extending interstitially disposed reinforcing elements 32 to form a mechanical interlock which improves joint strength over prior methods where the adherent was secured only to the joint surfaces of each part. Moreover, as explained in more detail below, the adherent used may be urged partially up the length of the individual reinforcing elements as shown at 34 for even a more cohesive bond. The reinforcing elements, therefore, prevent surface ply delamination and improve the strength of joint 36. Reinforcing elements 32 may be boron, carbon, glass, organic or ceramic fibers, or metallic wires.

Figure 5:
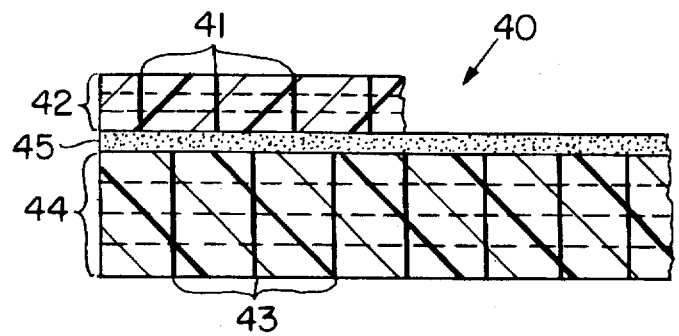
FIG. 5 is a schematic diagram of a reinforced joint according to this invention tested to failure.

In fact, structural tests performed on joined parts according to this invention resulted in part failure as shown at 40, FIG. 5, for joined parts 42 and 44 before either joint failure or delamination. In this case, the reinforcing elements 41 and 43 of parts 42 and 44, respectively, were filed flush at joint region 45 and not left extending as described above.

Figure 6:
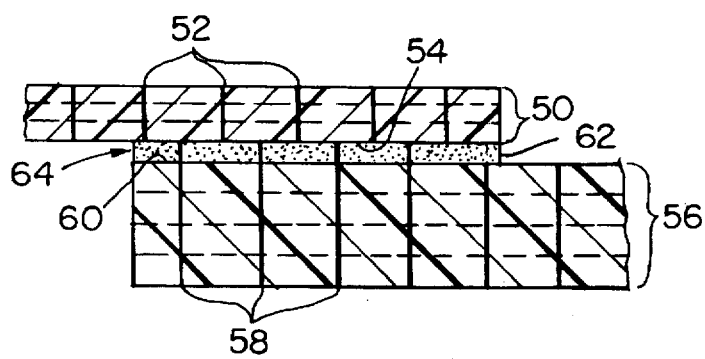
FIG. 6 is a schematic diagram of another embodiment of a reinforced joint for composite structures according to this invention.
Figure 7:
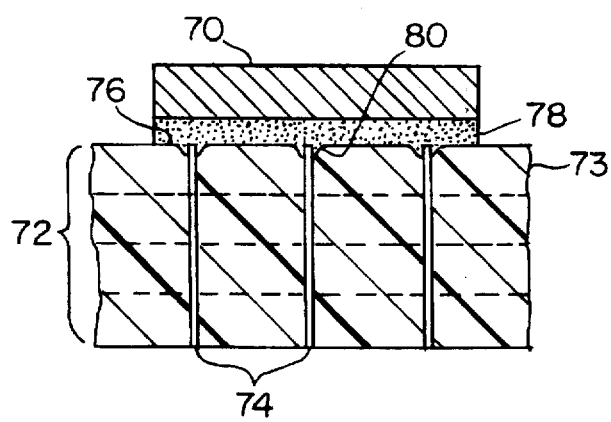
FIG. 7 is a schematic diagram of a reinforced joint between a composite part and a non-composite part according to this invention.

Therefore, both parts need not include extending reinforcing elements as shown for adherend 50, FIG. 6, which includes reinforcing elements 52 which are flush along joint surface 54. Adherend 56, however, includes reinforcing elements 58 which extend from joint surface 60. Adhesive or brazing adherent 62 is used to form joint 64. On that score, if a non-composite structure such as metal rib 70, FIG. 7, is to be joined with composite structure 72, reinforcing elements 74 may be rendered flush along joint surface 76 and the resulting joint is still stronger than prior art methods since adherent 78 will seep partially down along reinforcing elements 74 as shown at 80. In this embodiment, the reinforcing elements reduce delamination of surface ply 73 and also anchor the adherent within composite structure 72 along the lengths of reinforcing elements 74. Alternatively, the reinforcing elements 88, FIG. 8, may be left extending from joint surface 92 of composite part 86 disposed against joint surface 94 of non-composite stiffener 84 and adherent 90 bonds to the reinforcing elements 88 and joint surfaces 92 and 94. Therefore, the reinforcing elements may be left extending from both adherends, only one adherend, or a few reinforcing elements may be left extending at the joint surface and others could be disposed even slightly below the joint surface.

In a preferred embodiment, carbon-carbon adherend 100, FIG. 9 comprising alternating layers of carbon weave material 102 and matrix material 104 may be joined with carbon-carbon adherend 106 wherein each adherend 100 and 106 includes carbon fiber rods or metallic wires 108 and 110 extending from joint surface 112 and 114 respectively.

The rods are first inserted into the carbon-carbon adherends 100 and 106 step 120, FIG. 10, and the reinforced adherends 100, 106, FIG. 9 are assembled, step 122, FIG. 10 such that the extending reinforcing rods are interstitially disposed at joint region 107, FIG. 9. Braze material 109 is then injected to flow into the joint region 107, step 124 so that the braze material 109 attaches to rods 108, 110 and also to carbon-carbon substrate 100, 106. The braze material 109 also travels up the rods providing a more cohesive bond between the rods and the carbon-carbon materials.

Figure 11:
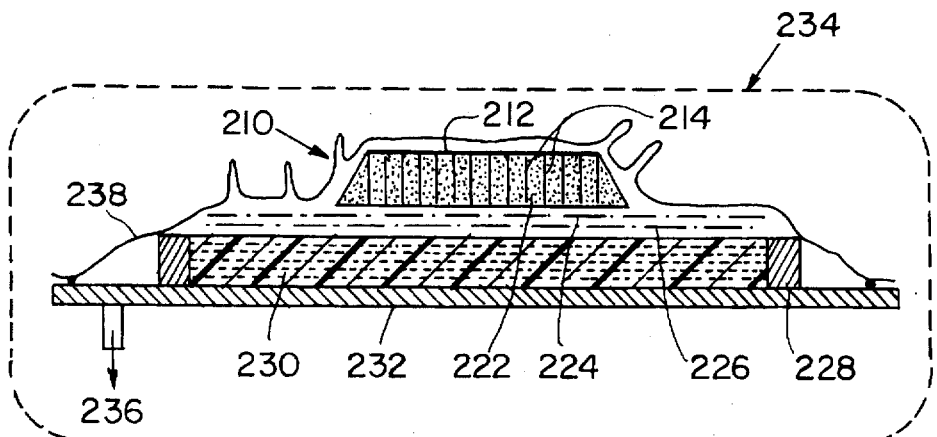
FIG. 11 is a schematic diagram showing the assembly required for inserting reinforcing elements into a composite structure according to this invention.

Inserting the fibers, step 120, FIG. 10, may be accomplished as follows. Prepreg 230, FIG. 11, is assembled with reinforcing structure 210 on support tool 232. Reinforcing structure 210 includes a body 212 of polyvinyl foam material (Divinycell HT 110) that has a density of about 7 lbs/cubic foot and a thickness of about 8 mm. An array of rods or fibers 214 (each about 0.1 mm in diameter and 8 mm long) are disposed in body 212. Spacing between fibers 214 is about 1.5 min.

Figure 12:
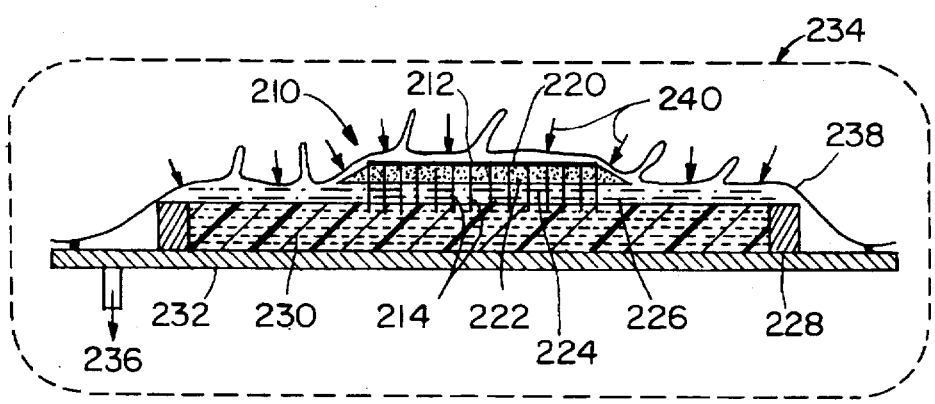
FIG. 12 is similar to FIG. 10 showing the insertion of the reinforcing elements through the thickness of a composite structure according to this invention.
Figure 13:
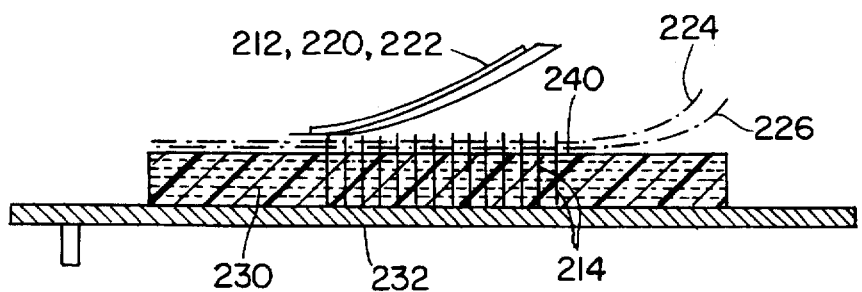
FIG. 13 is a schematic diagram showing the reinforcing elements of FIG. 11 extending through the thickness of the composite structure according to this invention and left extending at the joint surface.

Support tool 232 is in communication with vacuum source 236, and film bag 238 enclosing release sheet 226, bleeder cloth 224, and cork damn 228 as well as prepreg 230 (epoxy AS 4/3501-6) with reinforcing structure 210 and support tool 230 is placed in autoclave 234. Vacuum bag 238, FIG. 12 is first initially evacuated by vacuum 236 to a pressure of 25 inches of mercury, and then an external pressure as indicated by arrows 240 of 85 lbs/square inch is applied. The autoclave temperature is ramped up at a rate of 3–5 degrees per minute, to raise the temperature to 240° F. while holding the autoclave pressure at 85 lbs. and the vacuum bag at about 25 in. of mercury. The temperature, pressure, and vacuum are held for about 1 hour. As the matrix material approaches its minimum viscosity, the vinyl body 212 begins to decompose and the autoclave pressure acting on pressure intensifying sheet 220 forces the fibers 214 through release plies 222, 226 and bleeder cloth 224 into laminate 230 in the Z direction. Continued application of pressure drives fibers 214 through the laminate 230 to impinge on support tool 232. After about an hour, the autoclave temperature is again raised at a rate of 3–5 degrees/minute to 350° F. and held at the temperature and pressure for a cured interval of about two hours for curing the laminate. The temperature of the autoclave is lowered at a rate of about 5 degrees/minute to reduce the laminate temperature to 200° F. Autoclave pressure and vacuum are released and the cured reinforced composite is removed from the autoclave and unbagged as indicated in FIG. 13. After removal of plastics residue 212, and plies 220, 222, 224, and 226 from cured laminate composite part 230, it is ready to be joined with a similarly manufactured composite part. As discussed above, the reinforcing fibers extending from joint surface 240 will provide the mechanical interlocking for an improved joint. The patent to Boyce (U.S. Pat. No. 4,808,461) further describes this process and also the benefits of such through-the-thickness reinforcement.

Other methods of disposing reinforcing elements through the thickness of a composite adherend are within the scope of this invention including manual insertion techniques, or automatic needling methods.

In general, then, fabrication of a reinforced joint for composite parts begins with the layup of each composite part, step 300, FIG. 14. For example, plies of cloth phenolic prepreg including T300 carbon woven fiber prepreged with a phenolic resin are laid up to form the desired structural shape as is known.

Titatium reinforcing elements are then inserted, step 302, at least at the joint regions as explained above in reference to FIGS. 10–12 but may also be inserted throughout the structure or at area requiring added reinforcement. In the autoclave, a certain percentage of phenolic resin turns to carbon. If required, the plies may be reimpregnated with phenolic resin and subjected to the autoclave process again after the reinforcing elements are inserted.

Two such parts are then assembled, step 304 as described above: both having reinforcing elements extending from the joint surfaces, only one having reinforcing elements extending from its joint surface; or both parts having the reinforcing elements cut or filed flush depending on the application.

Next, a suitable braze material, such as vanadium, is selected, step 306, in the form of a foil or powder on a scrim and applied at the joint region. Baking for typically 10 minutes causes the braze material to flow around the extending reinforcing elements and also urges braze material partially down along the length of the reinforcing elements and into the structures at the joint region. When cooled, an improved joint includes the joint surface of each part, the reinforcing elements, and the braze material.

In another example, cured composite carbon-epoxy laminates having extending reinforcing elements at the joint region are assembled, step 304, and an interlayer adherent such as a prepreg material (AS 4/351-6) or film adhesive is selected, step 306. A vacuum bag curing process, step 308, similar to the autoclave process described above drives the reinforcing elements into the adhesive layer between the two parts and cures the resin about the reinforcing elements at the joint region for a strong joint between the two parts.

Figure 8:
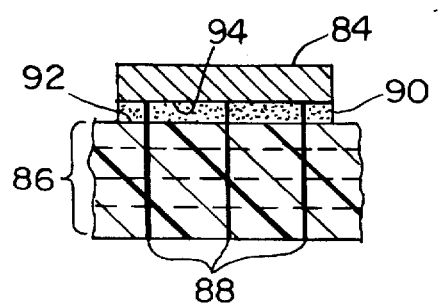
FIG. 8 is a schematic diagram of a reinforced joint between a composite part and a non-composite part which reinforcing elements are left extending from the joint surface of the composite part according to this invention.

If a carbon-carbon or other composite part is to be joined with a metal or other non-composite stringer or reinforcement structure, such as is shown in FIG. 7 or FIG. 8, processing is similar except the braze or adherent chosen should be compatible with both the reinforcing elements of the composite part and the material of the reinforcing non-composite stringer.

Figure 15:
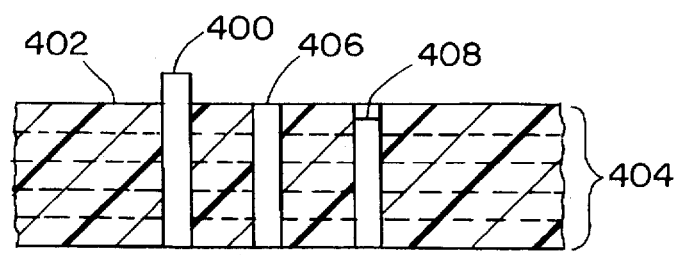
FIG. 15 is a schematic diagram of the joint surface of one adherend according to this invention showing the reinforcing elements exposed by extending the reinforcing elements, leaving the reinforcing elements flush with the surface, or even recessed from the surface.

As delineated above, the design choice may warrant having reinforcing element 400, FIG. 15, left extending from joint surface 402 of adherent 404, reinforcing element 406 filed flush, or recessed reinforcing element 408 exposed as shown, or any combination of these choices. The adherent will then attach to the reinforcing element and the objects of this invention will be met.

Therefore, although specific features of the invention are shown in some drawings and not others, this is for convenience only as some feature may be combined with any or all of the other features in accordance with the invention.

And, other embodiments will occur to those skilled in the art and are within the following claims:

What is claimed is:

1. A joined composite part structure comprising:

a pair of composite members, each comprising layers of plies of fiber arrays in a resin matrix, and each including a plurality of discrete, extrinsic reinforcing fibers disposed transversely through the thickness thereof, at least a number of said reinforcing fibers extending from the joint surface of each said member;

a joint region between said composite members bounded by the joint surface of each said composite member and including said discrete transversely extending reinforcing fibers interstitially disposed therein; and an adhesive disposed about said extending interstitially disposed reinforcing fibers between said joint surfaces within the joint region.

2. The structure of claim 1 in which said adhesive is a brazing material.

3. The structure of claim 1 in which said adhesive is a prepeg material.

4. A joined composite part structure comprising:

a pair of composite members, each comprising layers of plies of fiber arrays in a resin matrix, one said member including a plurality of discrete, extrinsic reinforcing fibers disposed transversely through the thickness and extending from the joint surface thereof;

a joint region between said members bounded by the joint surface of each said member and including the extending reinforcing fibers of said one member disposed against the joint surface of the other said member; and an adhesive disposed in said joint region and about said extending reinforcing fibers and between said joint surfaces.

5. A joined composite part structure comprising:

a pair of composite members, each comprising layers of plies of fiber arrays in a resin matrix, and each including a plurality of discrete, extrinsic reinforcing fibers disposed transversely through the thickness thereof, at least a number of said reinforcing fibers exposed at the joint surface of each said member;

a joint region between said members bounded by the joint surface of each said member and including said exposed reinforcing fibers; and an adhesive about said exposed reinforcing fibers between said joint surfaces within the joint region.

6. A joined composite part structure comprising:

a pair of cured composite members each including longitudinally extending fibers in a hardened resin matrix and a plurality of extrinsic, discrete reinforcing fibers disposed through the thickness thereof transverse to the longitudinally extending fibers, at least a number of said reinforcing fibers extending from the joint surface of each said member;

a joint region between said members bounded by the joint surface of each said member, said joint region including said discrete extending reinforcing fibers interstitially disposed therein; and an adhesive about said extending interstitially disposed reinforcing fibers between said joint surfaces and within the joint region.

7. The structure of claim 6 in which said adhesive is a brazing material.

8. The structure of claim 6 in which said adhesive is a prepeg material.

* * * * *